Oct. 21, 1969     G. SCHMUCKLER     3,473,921

METHOD FOR RECOVERY OF NOBLE METALS

Filed Jan. 6, 1969

INVENTOR.
GABRIELLA SCHMUCKLER
BY
OSTROLENK, FABER, GERB & SOFFEN
ATTORNEYS

United States Patent Office 3,473,921
Patented Oct. 21, 1969

3,473,921
METHOD FOR RECOVERY OF NOBLE METALS
Gabriella Schmuckler, Haifa, Israel, assignor to Technion Research and Development Foundation, Ltd., Technion City, Haifa, Israel
Continuation-in-part of application Ser. No. 467,995, June 29, 1965. This application Jan. 6, 1969, Ser. No. 789,192
Int. Cl. B01d 15/04; C01g 7/00, 55/00
U.S. Cl. 75—118                                             8 Claims

ABSTRACT OF THE DISCLOSURE

A new and improved method for the separation and recovery of gold and/or one or more platinum metals from ores, used catalysts, or combinations with other materials containing such noble metals, involving the adsorption of one or more noble metal constituents present on a selective ion exchange resin, said resin selectively chelating the noble metal constituent thereon. A specific resin which is useful in separating and recovering the noble metal constituents is a chloromethylated styrene-divinyl benzene resin reacted with thiourea.

---

The present application is a continuation-in-part of U.S. application Ser. No. 467,995 filed June 29, 1965, now abandoned.

BACKGROUND OF THE INVENTION

Field of the invention

The present invention relates to a new and superior method for the separation and recovery of gold and/or one or more platinum metals, i.e., platinum, palladium, rhodium, iridium, osmium and ruthenium, from compositions containing such noble metals in combination with other materials, from ores, used catalysts, residues from chemical processes, spent solutions, and the like. In the present process, the composition containing the desired noble metal constituent or constituents is brought into contact with the selective ion exchange resin and the desired noble metal constituent or noble metal constituents are selectively adsorbed on the resin.

The noble metal constituents referred to herein include, for example, gold, platinum, palladium, rhodium, iridium, osmium and ruthenium.

Description of the prior art

Prior art procedures for the recovery of noble metal constituents from ores, metal scrap, residues from chemical processes, spent solutions and combinations of noble metals with other materials, included the use of precipitation, cyanidization, amalgamation and electrolysis procedures. Unfortunately, such procedures were not only relatively expensive in terms of energy requirements but were also relatively slow. In addition to the aforesaid techniques, attempts were made to use weak-base or strong-base anion exchange resins in recovering noble metals such as gold, silver, and the like from alkaline cyanide solutions. However, it was found that such anion exchangers did not possess any special affinity for the noble metals when they were combined with base metals such as zinc, copper, nickel, lead and iron. Thus, the anion exchange resin technique could not successfully and efficiently separate the noble metals when they were in combination with the aforesaid base metals. Additionally, the capacity of the anion exchange resins for adsorbing metals was found to be extremely low and therefore, the prior art techniques were considered to be impractical. In addition, extraction by the use of anion exchange resins required complicated separation processes for the final recovery of the desired noble metals.

SUMMARY OF THE INVENTION

The present invention provides a novel and superior method for the recovery of the noble metals such as gold, platinum, palladium, rhodium, osmium, iridium and ruthenium from combinations of such metals with other substances. Among the materials from which the noble metals are separated and recovered are ores, used catalysts, metal scrap, residue from chemical processes, spent solutions and solutions containing said noble metals particularly when these noble metals are present in combination with one or more base metals. By use of the present procedure, the noble metals are recovered not only in high purity but also with minimal processing. For example, in one embodiment of the present process, the procedure involved is a simple continuous process requiring only gravity circulation or a low energy power source for circulation of the solutions or media containing the noble metals which are desired to be recovered in fairly pure form.

The present process involves contacting compositions containing the noble metal constituents with an ion exchange resin containing recurring units of the formula

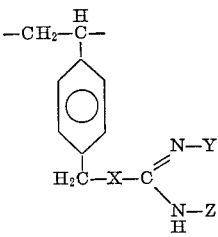

wherein
(1) X is a member selected from the group consisting of sulfur, oxygen,

group and a $(-CH_2-)_n$ group wherein $n$ is an integer of 1 to 4, inclusive,
(2) Y is a member selected from the group consisting of hydrogen, alkyl, alkenyl and aryl including substituted aryl, and
(3) Z is a member selected from the group consisting of hydrogen, alkyl, alkenyl and aryl including substituted aryl, it further being permissible for the group

to be $NH_3^+Cl^-$.

The term "alkyl" as used herein is meant to include groups containing from 1 to 6 carbon atoms and illustratively, methyl, ethyl, n-propyl, isopropyl, n-butyl, n-amyl, n-hexyl, and the like; alkenyl is meant to include monovalent unsaturated radicals having from 2 to 6 carbon atoms, e.g., ethenyl, propenyl or the like; and aryl is meant to cover phenyl, naphthyl, and the like, including substituted aryl as, for example, aralkyl groups in which the alkyl substituents thereof have, as noted above, from 1 to 6 carbon atoms.

BRIEF DESCRIPTION OF THE DRAWINGS

In the attached drawings.

PREFERRED EMBODIMENTS OF THE INVENTION

Figure 1:
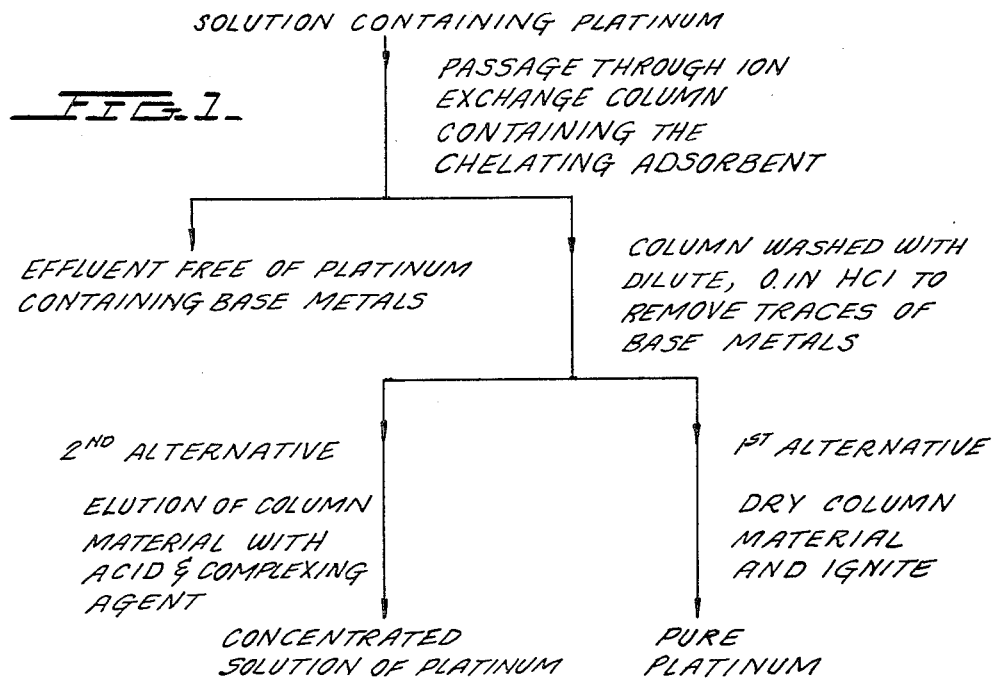
FIGURE 1 is a chemical flow diagram showing extraction of a typical noble metal, that is, platinum, in accordance with the process of the present invention.

Referring now to the drawings in greater detail, FIGURE 1 represents a chemical flow diagram illustrating a typical extraction of the noble metal platinum, from a solution containing this metal, by use of the process of the present invention. Before passage through or contact with the ion-exchange resin, the noble metal or metals to be separated and recovered must be in solution, and the preparation of scrap, residues, used solutions, used catalysts, and the like, of the noble metals before extraction is a standard procedure. Reference is accordingly made to "The Rare Metals Handbook," edited by C. A. Hampel and published by Reinhold Publishing Co., 1954, describing the preparation of a solution containing noble metals to be extracted.

Accordingly the prepared solution containing the noble metal platinum is passed through or brought into contact with an ion exchange column as shown in the first step of FIGURE 1. Due to the highly selective action of the chelating resins used in the process of the present invention and the high capacity of such resins for adsorbing noble metals, the platinum is removed from the solution. The effluent from the ion exchange resin is therefore virtually free of platinum but does contain the base metals which were present in the solution before passage through or contact with the ion-exchange column. The effluent is discharged after passage through the ion-exchange column, and the column containing the unique resin is then flushed with a dilute solution of about 0.1 N HCl so as to remove all traces of the base metals present in the solution remaining in the column.

There are two alternatives which can be used in the final recovery of the noble metal platinum; the first alternative involves removal of the resin from the ion-exchange column with its charge of adsorbed platinum followed by drying this material and igniting the resin in an oven. As shown in FIGURE 1, pure platinum is obtained by this procedure. Alternatively, if it is desired to obtain the highly purified platinum in a concentrated solution, the second alternative procedure shown in FIGURE 1 can be utilized; thus by use of a standard technique the column material, that is the resin with its adsorbed charge of platinum, may be eluted with acid and a complexing agent, e.g., thiourea, guanidine, etc.

The concentrated solution of platinum can then be filtered out after elution.

Figure 2:
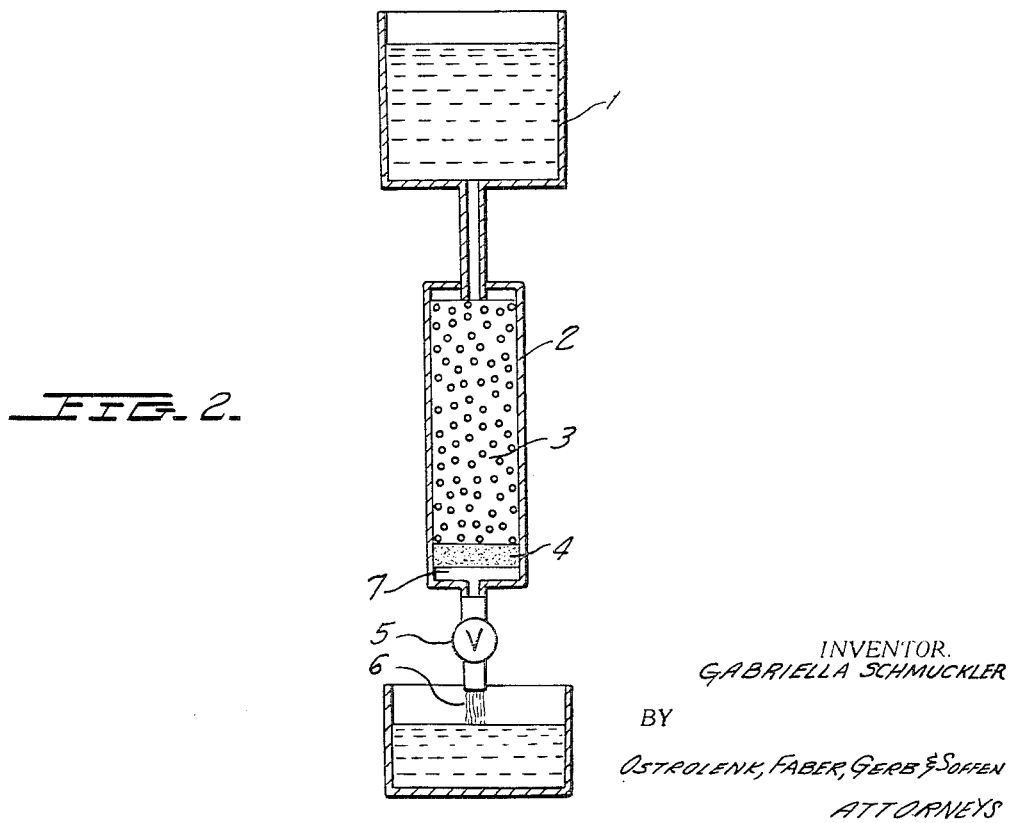
FIGURE 2 illustrates a simple type of apparatus which may be employed for the purpose of the present invention.

FIGURE 2 illustrates a simple apparatus which can be used according to the method of the present invention. A vessel holding the solution 1, containing platinum and/or other noble metals, in addition to any combination of base metals, is so set up that the solution can flow by gravity to the ion-exchange column container 2. The column container is packed with beads 3, of about 20 to 50 mesh, of one resin of the present invention that is, a chloromethylated styrene-divinyl benzene resin in which thiourea has been incorporated. Adjacent to the outlet of the ion-exchange column is a filtered plug 4 to prevent particles of the resin from flowing out of the column with the effluent 6. To control the flow of the solution through the ion-exchange column, the stopcock 5 is used. Once the solution has passed through the column and the column material is flushed with dilute hydrochloric acid, the column resin, with its charge of adsorbed noble metal, is removed by withdrawing the stopper 7. The column material is then either roasted to obtain noble metal(s) in pure metallic form or it can be eluted with an acid and complexing agent to obtain a concentrated solution of the noble metal(s), free of any base metals.

The unique ability of the resin described in the present application to selectively separate and recover noble metals from combinations thereof with other materials seems to be due to the presence, in such resins, of a "resonating" constituent which is represented as follows:

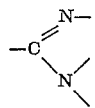

A typical resin which has been found to be useful in selectively separating and recovering noble metal constituents from combinations with other substances is a chloromethylated styrene-divinyl benzene resin reacted with thiourea, said resin having recurring units of the formula:

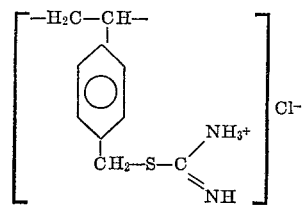

Selectivity of resins for separating and recovering noble metals from combinations thereof with other substances is not impaired when aromatic, saturated or unsaturated aliphatic radicals are substituted for the hydrogen atoms on the nitrogen atoms. Such thiourea derivatives include resins having recurring units of the following formulae:

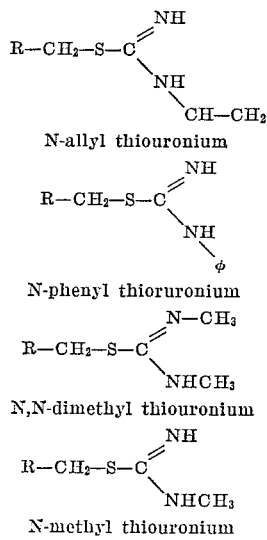

In the above formulae, R is meant to identify a copolymer of styrene with divinylbenzene.

The selectivity of ion-exchange resins for noble metals is also found in derivatives wherein the thiouronium group as a whole is replaced by a molecule containing similar resonating amino groups. Typical illustrations include resins having recurring units of the formulae.

Urea:

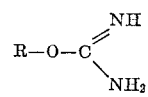

Guanidine:

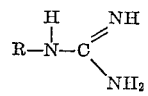

Amidine:

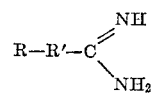

In the above formulae, R represents a copolymer of styrene with divinylbenzene; and R' is intended to cover an aliphatic chain such as, for example, methylene chains having from 1 to 4 carbon atoms.

The following examples illustrate, in nonlimiting form, various specific embodiments of the process of the present invention for effectively separating noble metals from combinations thereof with other substances by the use of selective chelating ion exchange resins.

EXAMPLE I

Powdered ore from northern Ontario sources known to contain approximately 200 to 400 micrograms of the subject noble metals per 30 grams of ore was dissolved in aqua regia and filtered to remove insolubles. The filtrate was then evaporated in order to eliminate nitric oxides and to reduce acidity followed by dilution with water to further reduce acidity and lower the salt concentration. The solution was then passed through a column containing the chloromethylated styrene-divinyl benzene resin which had been reacted with thiourea. Beads of this resin are prepared from styrene containing from 1 to 2% divinylbenzene by copolymerization. The beads of resin so produced are then chloromethylated by a procedure described by Pepper, K. W. et al., in the J. Chem. Soc., 4097 (1953) (the chloromethylated beads of resin are available commercially). Finally, the resin beads are refluxed with thiourea as described by Parrish, J. R., in Chem. and Industry, 137 (1956). (It should be noted that Parrish goes on to hydrolyze the refluxed resin beads to obtain a redox resin which is not selective for the noble metals). Gold, platinum and palladium were adsorbed on the resin. All other constituents of the solution passed freely through the column without being adsorbed.

EXAMPLE II

Thirty grams of copper ore from the Timna copper mines in Israel was dissolved in aqua regia. Thirty micrograms of gold were added thereto and the sample was filtered to remove insolubles. The filtrate was then evaporated, diluted with water and passed through a column containing the resin used in Example I. The subject ore is known not to contain noble metals. Subsequent recovery of the gold added was in excess of 98%.

EXAMPLE III 20 liters of a solution containing 1.5 micrograms of gold per liter of water ($7.5 \times 10^{-9}$ M) were passed through a column containing 0.200 gram of the resin of Example I. (Dimensions of the column were: internal diameter—4 mm., length—55 mm.) at the rate of approx. 0.2 l./hr. After the solution had passed through, the gold was seen to have accumulated near the top of the column (an intensely yellow strip 5 mm. wide appeared at the top end of the column). The resin was then burnt, and photometric analysis showed that the entire 30 micrograms of gold had been adsorbed on the resin. This fact points to the possibility of binding gold from even more dilute solutions to the column. A further possibility is an increase in the rate of flow, if a longer column is used.

The same procedure described above is also utilized to selectively recover platinum and palladium from compositions thereof with other substances.

For treating spent catalysts, the following procedure has been found most effective: First, the catalyst is rinsed in water, filtered, and the solid residue dissolved in aqua regia. The solution is then filtered to remove separate solids and the filtrate evaporated to eliminate nitric oxides. Water is then added to reduce acidity and salt concentration, and the sample is passed through a column containing the resin used in Example I.

Sludge is treated in a manner similar to that used on ores; thus, the sludge is dissolved in aqua regia, evaporated, diluted with water and passed through the ion-exchange resin column.

EXAMPLES IV–IX

Gold was recovered from various dilute acid solutions, employing the resin described in Example I above (Examples IV, VII), and two further resins prepared as described hereinafter and having substituted for the thiourea moiety of the chelating resin N-allyl thiouronium (Examples V and VIII) and N-phenyl thiouronium (Examples VI and IX) groups, respectively.

In each of Examples IV–VI one ml. of the wet resin (approximating 250 mg.) was contacted with 160 ml. of a dilute acid solution containing 116 mg. of gold. The gold concentration in each such batch was determined as a function of time.

In Examples VII–IX the resins remaining after adsorption of the gold containing solutions in Examples IV–VI, respectively, were further contacted with 100 ml. of an additional solution incorporating 66.5 mg. gold. The gold concentrations in the resulting solutions were again measured as a function of time.

The data thus obtained employing the respective ion exchange chelating resins of the present invention are set forth in the following table:

Au REMAINING IN SOLUTION (mg.)

| Time (mins.) | Example IV Thiourea resin [1] | Example V N=allyl thiouronium resin [2] | Example VI Phenyl thiouronium resin [3] | Example VII Thiourea resin [1] | Example VIII N=allyl thiouronium resin [2] | Example IX Phenyl thiouronium resin [3] |
|---|---|---|---|---|---|---|
| 0 mins | 116 | 116 | 116 | | | |
| 5 mins | 70.0 | 50 | 72.0 | | | |
| 10 mins | 42.0 | 30 | 38.0 | | | |
| 15 mins | | | | 37.5 | 43.6 | |
| 30 mins | 6.0 | 4.0 | 26.0 | 22.5 | 37.5 | |
| 60 mins | 0 | 0 | Traces | 22.5 | 31.2 | 51.5 |
| 120 mins | 0 | 0 | Traces | | | |
| 150 mins | | | | 0 | | |
| 240 mins | | | | 11.2 | 10.0 | 31.2 |
| 48 hrs | | | | 0 | 0 | Traces |

[1] The thiourea resin had the following analysis: "C–53.46%, H–5.80%, N–11.33%, S–13.10%, Cl–14.00%, moisture–2.31%". The resin was prepared as described in Example I above.
[2] The N-allyl thiouronium resin had the following analysis: "C–63.46%, H–6.51%, N–8.39%, S–9.74%, Cl–10.75%, moisture 1.15%." This resin was prepared as described in Example I above, the resin product subsequently being refluxed by N-Allyl Thiourea.
[3] The N-allyl thiouronium resin had the following analysis: "C–65.89%, H–6.07%, N–6.94%, S–8.03%, Cl–11.61%, moisture 1.46%." The resin was prepared as described in Example I above, the resin product subsequently being refluxed by N-Phenyl Thiourea.

The preceding examples describe the various preferred embodiments of the process of the invention. It will, however, be understood that many variations in the specific embodiments described may be made by those skilled in the art without departing from the scope of the invention. Accordingly, it is intended that this specification be construed as illustrative and not in a limiting sense.

The embodiments of the invention in which an exclusive privilege or property is claimed are defined as follows.

I claim:

1. A process for the separation and recovery from a composition, gold and/or one or more platinum metal group constituents, which comprises contacting said composition with a chelating ion exchange resin having recurring units of the formula $$-CH_2-\underset{|}{\overset{H}{C}}-\phantom{xxx}\text{(with phenyl ring bearing }H_2C-X-C(=N-Y)(NH-Z)\text{)}$$

wherein (1) X is sulfur, oxygen, $$(-\underset{|}{\overset{H}{N}}-)$$

group or a $(-CH_2-)_n$ group wherein $n$ is an integer of 1 to 4, inclusive, (2) Y is hydrogen, alkyl, alkenyl, or aryl, and
(3) Z is hydrogen, alkyl, alkenyl, or aryl, or in which $$\underset{|}{\overset{N-Z}{H}}$$

is $NH^+_3Cl^-$.

2. A process according to claim 1 wherein the ion exchange resin is a member selected from the group consisting of recurring units of the formulae $$CH_2-CH-\phantom{xxx}\text{(phenyl, }H_2C-S-C(=NH)(NH-CH=CH_2)\text{)}$$

and $$\left[-CH_2-CH-\phantom{xxx}\text{(phenyl, }CH_2-S-C(=NH)(NH_3^+)\text{)}\right]Cl^-$$

3. A process according to claim 1 wherein the ion exchange resin is a member selected from the group represented by recurring units of the formulae $$-CH_2-CH-\phantom{xxx}\text{(phenyl, }H_2C-S-C(=NH)(NH-Z)\text{)}$$

wherein Z is phenyl, and $$-CH_2-CH-\phantom{xxx}\text{(phenyl, }H_2C-O-C(=NH)(NH_2)\text{)}$$

4. A process according to claim 1 wherein the ion exchange resin is a member selected from the group represented by recurring units of the formulae $$-CH_2-CH-\phantom{xxx}\text{(phenyl, }H_2C-\underset{|}{\overset{H}{N}}-C(=NH)(NH_2)\text{)}$$

and $$CH_2CH-\phantom{xxx}\text{(phenyl, }H_2C-(CH_2)_n-C(=NH)(NH_2)\text{)}$$

wherein $n$ is an integer from 1 to 4, inclusive.

5. A process according to claim 1 wherein the metal constituents are selected from the group consisting of gold, platinum, palladium and rhodium, the resin being constituted of a chloromethylated styrene-divinyl benzene resin reacted with thiourea.

6. A process according to claim 5 wherein the chelating ion exchange resin is represented by recurring units of the formula $$\left[-CH_2-CH-\phantom{xxx}\text{(phenyl, }CH_2-S-C(=NH)(NH_3^+)\text{)}\right]Cl^-$$

7. A process according to claim 1 wherein the metal constituent is recovered by roasting the resin metal constituent material to burn off said resin and thereby separate the metal constituent therefrom.

8. A process according to claim 1, wherein the metal constituent-containing composition is initially placed in solution and such solution is then contacted with particles of said chelating ion exchange resin to adsorb the metal constituent thereon.

References Cited

Koster et al., Anal. Chim. Acta., vol. 38, 1967, pp. 179–184.

Clingman et al., J. of Applied Chemistry, May 1963, pp. 193–198.

Parrish, Chem. and Industry, Feb. 18, 1956, p. 137.

Pepper et al., Chemical Society Journal, 1953, pp. 4097–4105.

L. DEWAYNE RUTLEDGE, Primary Examiner

T. R. FRYE, Assistant Examiner

U.S. Cl. X.R.

75—101, 121; 260—2.2